US010363933B2

United States Patent
Khafagy et al.

(10) Patent No.: US 10,363,933 B2
(45) Date of Patent: Jul. 30, 2019

(54) SMART DRIVER PRESENCE STRATEGY FOR POLICE AND COMMERCIAL VEHICLES TO INCREASE AUTO-STOP ENGINE AVAILABILITY

(71) Applicant: FORD GLOBAL TECHNOLOGIES, LLC, Dearborn, MI (US)

(72) Inventors: Hafiz Shafeek Khafagy, Dearborn, MI (US); Mathew Alan Boesch, Plymouth, MI (US); Mark Edward Zyskowski, Plymouth, MI (US); Mohannad Hakeem, Dearborn, MI (US); Allen Magolan, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 626 days.

(21) Appl. No.: 15/059,728

(22) Filed: Mar. 3, 2016

(65) Prior Publication Data

US 2017/0253245 A1    Sep. 7, 2017

(51) Int. Cl.

| | |
|---|---|
| *B60W 30/18* | (2012.01) |
| *B60W 10/184* | (2012.01) |
| *B60W 10/30* | (2006.01) |
| *B60W 30/188* | (2012.01) |
| *B60K 28/04* | (2006.01) |
| *B60R 22/48* | (2006.01) |
| *B60T 7/12* | (2006.01) |
| *B60W 10/06* | (2006.01) |
| *B60W 10/18* | (2012.01) |
| *F02D 41/04* | (2006.01) |
| *F02N 11/08* | (2006.01) |

(Continued)

(52) U.S. Cl.
CPC ....... *B60W 30/18018* (2013.01); *B60K 28/04* (2013.01); *B60R 22/48* (2013.01); *B60T 7/12* (2013.01); *B60W 10/06* (2013.01); *B60W 10/11* (2013.01); *B60W 10/182* (2013.01); *B60W 10/184* (2013.01); *B60W 10/30* (2013.01); *B60W 30/1886* (2013.01); *F02D 41/042* (2013.01); *F02N 11/0818* (2013.01); *B60R 2022/4816* (2013.01); *B60W 2040/0881* (2013.01); *B60W 2510/244* (2013.01); *B60W 2710/1005* (2013.01); *B60W 2710/186* (2013.01); *B60W 2710/305* (2013.01); *F02N 2200/106* (2013.01); *Y02T 10/48* (2013.01)

(58) Field of Classification Search
CPC .... B60W 10/184; B60W 10/30; B60W 10/06; B60W 10/182; B60W 30/18018; B60W 30/1886; B60T 7/12; F02N 11/0822; F02N 2200/106
See application file for complete search history.

(56) References Cited

U.S. PATENT DOCUMENTS

| | | | |
|---|---|---|---|
| 7,983,812 B2 | 7/2011 | Potter | |
| 9,073,504 B2 | 7/2015 | Nedorezov et al. | |
| 10,040,455 B2 * | 8/2018 | Khafagy | B60W 10/06 |

(Continued)

*Primary Examiner* — Erin D Bishop
(74) *Attorney, Agent, or Firm* — David B. Kelley; Brooks Kushman P.C.

(57) ABSTRACT

A method of controlling a stop-start vehicle includes, in response to an engine being in an auto-stopped condition and a signal indicative of a driver exiting the vehicle, maintaining the engine in the auto-stopped condition. The method additionally includes securing vehicle wheels against rotation and reducing a convenience feature power consumption.

14 Claims, 3 Drawing Sheets

(51) Int. Cl.
*B60W 10/11* (2012.01)
*B60W 40/08* (2012.01)

(56) References Cited

U.S. PATENT DOCUMENTS

| | | | |
|---|---|---|---|
| 2014/0081562 A1* | 3/2014 | Kemwal | F02D 45/00 |
| | | | 701/112 |
| 2014/0214309 A1 | 7/2014 | Atluru et al. | |
| 2015/0088404 A1* | 3/2015 | Geissenhoener | B60K 28/04 |
| | | | 701/112 |

* cited by examiner

SMART DRIVER PRESENCE STRATEGY FOR POLICE AND COMMERCIAL VEHICLES TO INCREASE AUTO-STOP ENGINE AVAILABILITY

TECHNICAL FIELD

The present disclosure relates to automotive vehicles having engines equipped to auto-stop and auto-start, particularly commercial vehicles or police vehicles.

BACKGROUND

Stop/start vehicles may be equipped with an engine auto-stop feature. This feature shuts down the engine during certain periods of vehicle operation in order to conserve fuel. For example, the auto-stop feature may be engaged when the vehicle is stopped in traffic or at a stop light, rather than permitting the engine to idle. The engine may be restarted when the driver releases the brake or actuates the accelerator.

SUMMARY

A method of controlling a stop-start vehicle according to the present disclosure includes, in response to an engine being in an auto-stopped condition and a signal indicative of a driver exiting the vehicle, maintaining the engine in the auto-stopped condition, securing vehicle wheels against rotation, and reducing a convenience feature power consumption.

According to various embodiments, reducing a convenience feature power consumption may include deactivating a climate control system, deactivating a heated seat system, and/or deactivating a climate blower cooling fan.

According to various additional embodiments, the signal indicative of a driver exiting the vehicle may include a driver seat belt being unbuckled and/or a driver door being opened.

According to one embodiment, the engine is maintained in the auto-stopped condition, independent of an elapsed time with the engine auto-stopped.

According to an additional embodiment, inhibiting vehicle wheel rotation includes shifting a vehicle transmission into PARK or engaging a vehicle parking brake.

A vehicle according to the present disclosure includes an engine having auto-stop and auto-start functions, and a controller. The controller is configured to, in response to a signal indicative of a driver exiting the vehicle with the engine being auto-stopped, inhibit the auto-start function, inhibit vehicle wheel rotation, and reduce a convenience feature power consumption.

According to various embodiments, the vehicle is a commercial vehicle or a police vehicle.

According to one embodiment, the vehicle additionally includes a climate control system, and reducing a convenience feature power consumption includes reducing power consumption of the climate control system. This may include deactivating the climate control system and/or deactivating a climate blower cooling fan of the climate control system.

According to another embodiment, the vehicle additionally includes a heated seat, and reducing power consumption of the climate control system includes deactivating the heated seat.

According to another embodiment, the vehicle additionally includes a seat belt sensor configured to signal an engaged or disengaged status of a driver seat belt, and the signal indicative of a driver exiting the vehicle includes a signal from the seat belt sensor indicating that the driver seat belt has been disengaged.

According to an additional embodiment, the vehicle additionally includes a door sensor configured to signal an open or closed status of a driver door, and the signal indicative of a driver exiting the vehicle includes a signal from the door sensor indicating that the driver door has been opened.

According to further embodiments, the controller is configured to inhibit vehicle wheel rotation by commanding a transmission to shift into PARK and/or by commanding a parking brake to engage.

According to yet another embodiment, the controller is configured to inhibit the auto-start function independent of a time elapsed with the engine auto-stopped.

A method of controlling a vehicle according to the present disclosure includes, in response to an engine being auto-stopped and a signal indicating a driver exiting the vehicle, securing traction wheels against rotation, modifying a convenience feature power consumption from a first state to a decreased second state, and maintaining the engine in an auto-stopped condition. The method additionally includes, in response to a signal indicating the driver returning to the vehicle, modifying power consumption of the convenience feature to the first state.

Embodiments according to the present disclosure provide a number of advantages. For example, embodiments according to the present disclosure may, when a driver exits the vehicle, hold the vehicle stationary and extend the time available with the engine auto-stopped. This may increase fuel economy, and in turn, increase customer satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with a stop/start system controlling auto-stop and auto-start functions. The stop/start system may auto-stop the engine when the vehicle is stopped and the engine is not required for propulsion or other purposes. At a later time, the stop/start system may auto-start the engine when required for propulsion or other purposes. By stopping the engine when idling, overall fuel consumption is reduced. Unlike true hybrid vehicles, stop/start vehicles are not capable of pure electric propulsion. Furthermore unlike true hybrid vehicles, stop/start vehicles are not equipped with a traction battery. Rather they typically include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
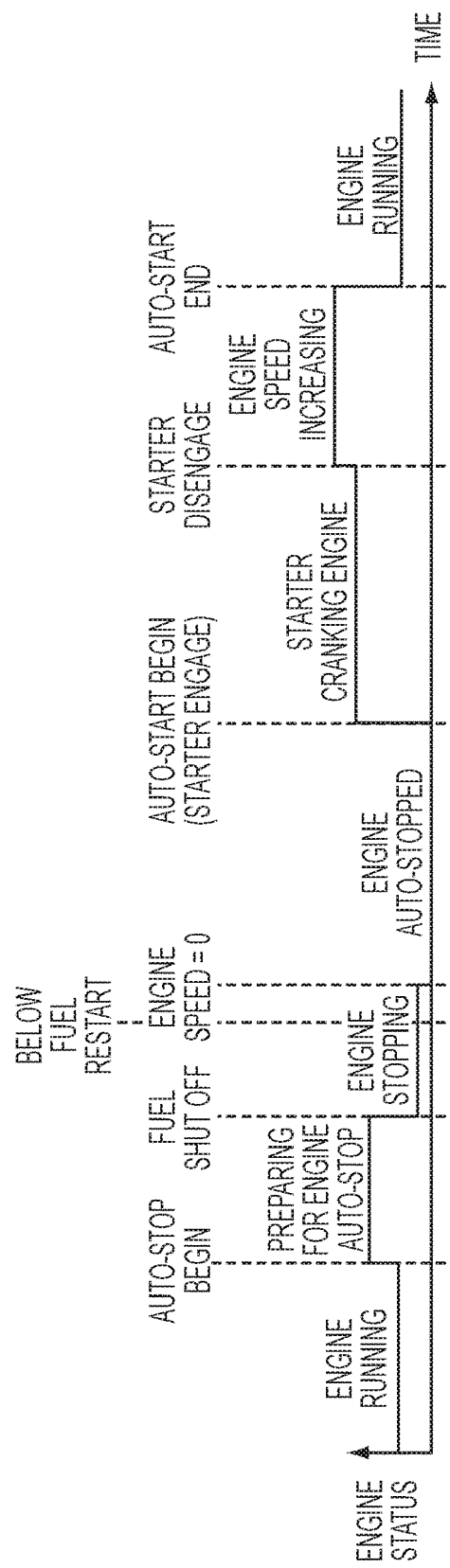
FIG. 1 is a plot illustrating engine status during an auto-stop.

With reference to FIG. 1, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

Generally, stop-start vehicles are configured to enable auto-stop only when the vehicle transmission is in a gear other than PARK. As a result, known stop-start vehicles are provided with driver presence detection systems. These known vehicles require a driver to be present when the engine is auto-stopped. When a driver begins to exit a vehicle while the engine is stopped, the engine is auto-started. Known vehicles are configured in this fashion to remind a driver that the vehicle is on and the transmission is in gear. The driver may then choose to turn off the vehicle, apply a parking brake, and/or shift the transmission to PARK.

As an additional consideration, while a vehicle does not consume fuel when auto-stopped, various vehicle systems may continue to draw electrical current. Examples include onboard electronics, vehicle lights, and climate control. These current-drawings systems may be classified as either essential features, such as onboard computer devices, and nonessential "convenience" features such as climate control, heated seats, and radio systems. As a result, stop-start vehicles are generally configured to auto-start when a calibratable time interval has elapsed after an auto-stop, in order to avoid over-depleting vehicle batteries.

While the above-described stop-start behavior is satisfactory for most consumer vehicles, for other classes of vehicles a driver presence requirement may not produce satisfactory results.

As an example, for a police vehicle, the driver may frequently stop and exit the vehicle for an extended period of time while the vehicle is running during a drive cycle, for example to issue a ticket or speak with a driver of another vehicle. Here, police vehicles refer to those vehicles designed for and used by police forces, including but not limited to police cruisers, police SUVs, and unmarked police cars.

As another example, for a commercial vehicle, the driver may frequently stop and exit the vehicle for an extended period of time while the vehicle is running during a drive cycle, for example to deliver a package or to load or unload the vehicle. Here, commercial vehicles refer to those vehicles designed and configured to transport goods and/or large numbers of passengers, including but not limited to semi-trucks, cargo vans, box trucks, and busses.

In both of the above examples, known stop-start vehicles would not auto-stop while the driver was outside the vehicle, nor would known stop-start vehicles remain stopped for extended periods of time. This behavior may result in a substantial amount of unnecessary fuel consumption.

Figure 2:
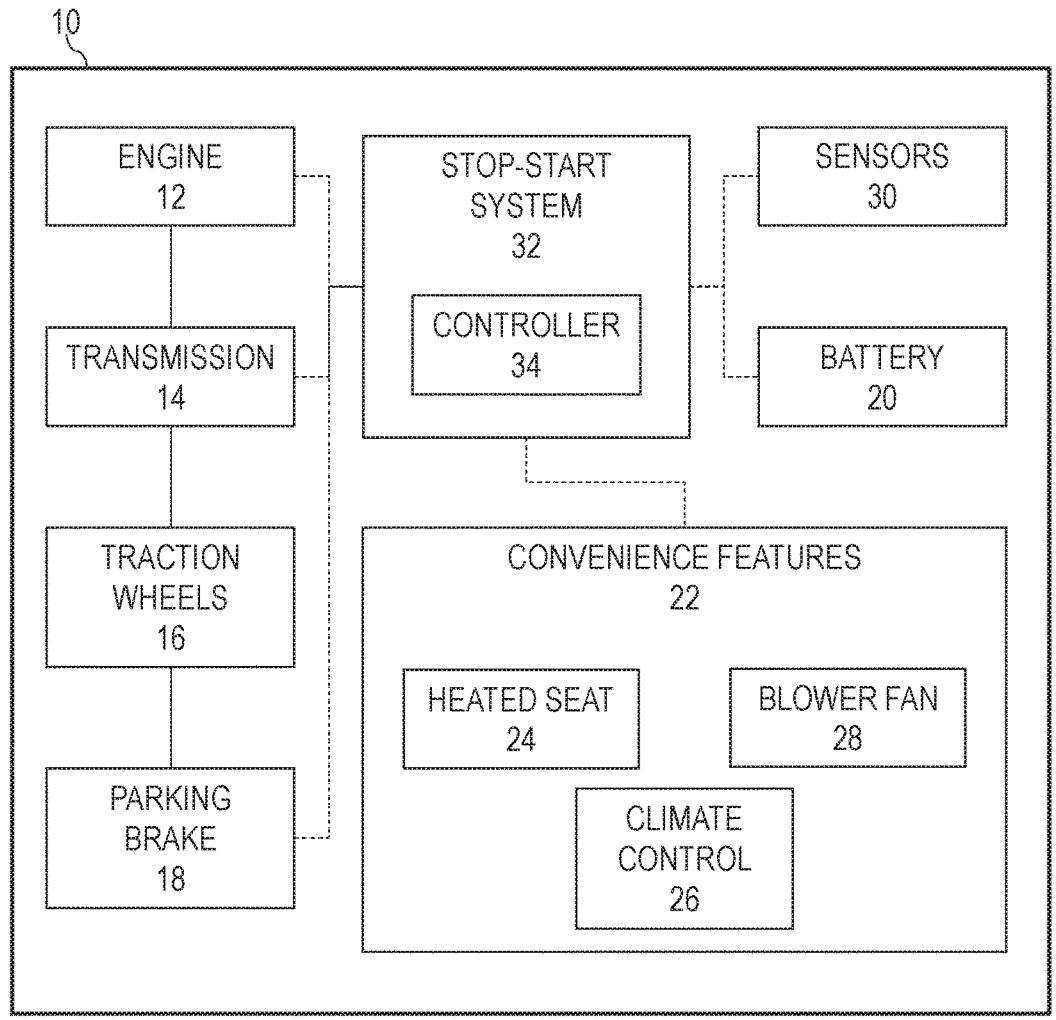
FIG. 2 is a block diagram of a stop/start vehicle.

With reference to FIG. 2, a schematic representation of a vehicle 10 according to the present disclosure is shown. In a preferred embodiment, the vehicle 10 is a police vehicle or a commercial vehicle. Other embodiments may include other types of vehicles.

The vehicle 10 includes an engine 12, which may be an internal combustion engine. The engine 12 is configured to auto-stop and auto-start in response to various commands, as will be discussed in further detail below. The engine 12 is coupled to a transmission 14. The transmission 14 is configured to transmit power from the engine 12 to vehicle traction wheels 16 according to a plurality of speed and torque ratios. The transmission 14 may be an automatic transmission, manual transmission, continuously variable transmission (CVT), or other appropriate transmission mechanism. The transmission 14 may include a PARK gear, in which rotation of the wheels 16 is inhibited. The vehicle 10 additionally includes a parking brake 18. When engaged, the parking brake 18 inhibits rotation of the wheels 16. The parking brake 18 may be a mechanical parking brake, electric parking brake, or other appropriate braking mechanism.

The vehicle 10 additionally includes a battery 20. The battery 20 may be an SLI (starting, lighting, ignition) battery. Such batteries are generally 12-volt batteries, and are configured to supply power to various systems such as a starter motor, vehicle lights, an ignition system, and other features as will be discussed below. However, other embodiments are contemplated having higher voltage and/or higher capacity than typical SLI batteries.

The vehicle 10 further includes various convenience features 22. The convenience features include a heated seat system 24, a climate control system 26, and a blower fan 28. Notably, the blower fan 28 may be activated separately from the climate control system 26 in order to circulate air in the vehicle 10 without actively heating or cooling the air. When active, the heated seat system 24, climate control system 26, and blower fan 28 all draw electric power from the battery 20. The vehicle 10 may include additional convenience features in addition to those depicted, including but not limited to a heated steering wheel, a vehicle radio and a vehicle navigation system. While not illustrated, any or all of the convenience features may have associated indicators in the vehicle interior to signal to a driver an activated or deactivated state of the convenience features.

The vehicle 10 further includes various sensors 30. The sensors 30 preferably include a driver seat belt sensor configured to signal an engaged or disengaged status of a driver seat belt. The sensors 30 also preferably include a driver door sensor configured to signal an open or closed status of a driver door. The sensors 30 may also include additional sensors as appropriate.

The engine 12, transmission 14, parking brake 18, battery 20, convenience features 22, and sensors 30 are all in communication with or under the control of a stop-start system 32 including at least one controller 34. While illustrated as one controller, the controller 34 may be part of a larger control system and may be controlled by various other controllers throughout the vehicle 10, such as a vehicle system controller (VSC). It should therefore be understood that the controller 34 and one or more other controllers may collectively be referred to as a "controller" that controls various systems in response to various signals, as will be discussed in further detail below. The controller 34 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 34 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The controller 34 may issue auto-stop commands and auto-start commands to the engine 12 during vehicle operation. The stop/start system 32, for example, comprises a nominal auto-stop/start logic that issues auto-stop commands and auto-start commands—to achieve, among other things, stages similar to that described with reference to FIG. 1—based on signals indicating vehicle speed, driver acceleration request, driver braking request, and state of charge (SOC) of the battery 20. In short, the engine 12 will be shut down in response to an auto-stop command and will be restarted in response to an auto-start command.

Figure 3:
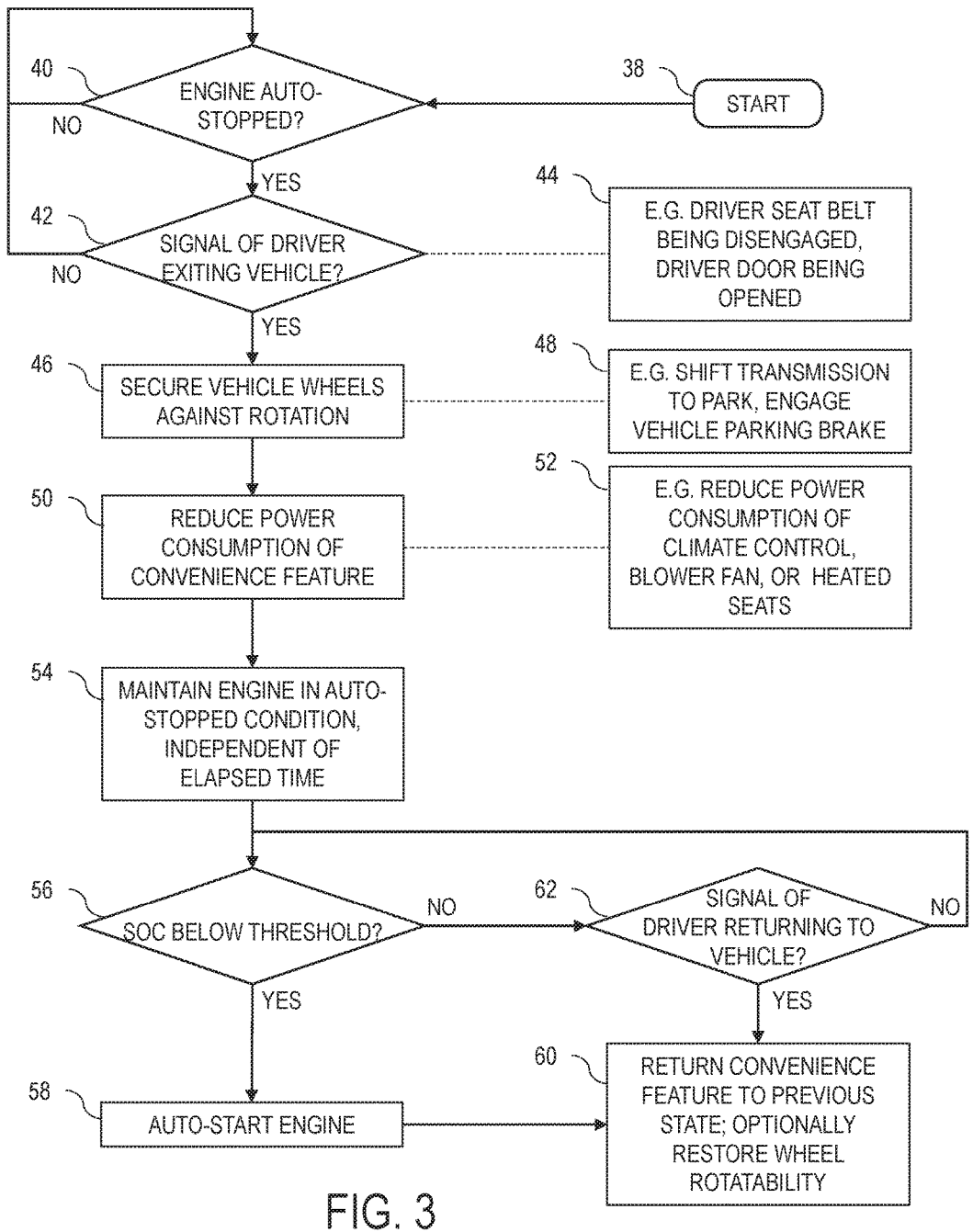
FIG. 3 is a flowchart illustrating an algorithm for controlling a start/stop vehicle.

Referring now to FIG. 3, a method of controlling a vehicle according to the present disclosure is illustrated in flowchart form. The method may be embodied in an algorithm performed by the controller 34, for example. The algorithm starts at block 38.

A determination is made of whether the engine has been auto-stopped, as indicated at operation 40. The engine may be auto-stopped, for example, in response to vehicle speed being approximately zero, vehicle brakes being applied, and no driver acceleration request being received.

If the determination of operation 40 is negative, i.e. the engine is not auto-stopped, then control returns to operation 40. Thus, the vehicle is controlled according to a nominal operating mode until the engine is auto-stopped.

If the determination of operation 40 is positive, i.e. the engine is auto-stopped, then control proceeds to operation 42. At operation 42, a determination is made of whether a signal has been received, indicative of the driver exiting the vehicle. As illustrated at block 42, this signal may include, for example, a signal indicating that the driver seat belt has been disengaged or a signal indicating that the driver door has been opened. Other signals may, of course, be used.

If the determination of operation 42 is positive, negative, i.e. no signal has been received indicating a driver exiting the vehicle, then control returns to operation 40. Thus, the vehicle is controlled according to nominal stop-start behavior unless and until the driver exits the vehicle.

If the determination of operation 42 is positive, i.e. a signal has been received indicating a driver exiting the vehicle, then control proceeds to block 46. At block 46, the vehicle wheels are secured against rotation. As illustrated at block 48, this may include shifting a vehicle transmission to PARK, if the transmission is in a non-PARK gear. In addition, or in the alternative, securing the wheels against rotation may include engaging the vehicle parking brake. Other appropriate methods of securing the vehicle wheels may also be used. The original state of the securing systems may be preserved in vehicle memory.

Control then proceeds to block 50. At block 50, power consumption of at least one convenience feature is reduced. As illustrated at block 52, this may include reducing power consumption of a climate control system, reducing power consumption of a blower fan, or reducing power consumption of heated seats. The power consumption may be reduced by deactivating the convenience feature or turning the convenience feature to a lower mode of operation, e.g. reducing speed of the blower fan. Other methods of reducing power consumption of convenience features may also be used. The original state of the convenience features, i.e. prior to the reduction in power consumption, is preserved in vehicle memory.

In some embodiments, the reduction in power consumption is performed without modifying any in-vehicle indicators. As an example, an in-vehicle indicator may still display that heated seats are active, while the heated seats have been deactivated to reduce power consumption. This may avoid customer confusion.

The reduction in power consumption of a convenience feature may reduce the power usage rate of the battery. While some battery drain will occur due to essential electronics usage in the vehicle, the power usage rate may be greatly decreased by reducing the power consumption of convenience features. As a result, the available time within which engine auto-stop is available may be substantially increased.

Control then proceeds to block 54. At block 54, the engine is maintained in an auto-stopped condition. As illustrated, the engine is maintained in this condition independent of elapsed time.

Control then proceeds to operation 56. At operation 56, a determination is made of whether current battery SOC is below an associated threshold. The threshold is provided in order to ensure that adequate battery charge remains to auto-start the engine at the appropriate time.

If the determination of operation 56 is positive, i.e. the SOC is below the threshold, then control proceeds to block 58. At block 58, the engine is auto-started, and may thus recharge the battery via an alternator.

Control then proceeds to block 60. At block 60, the convenience feature is returned to the previous state, which was preserved in vehicle memory. Thus, any deactivated or reduced-power systems are returned to the original state prior to the power consumption reduction of block 50. In addition, vehicle wheel rotatability may be restored to the previous state. As an example, the parking brake may be disengaged. While the transmission may be shifted to an original non-PARK gear, it may be preferable to only do so in response to an additional confirmation of driver presence, such as an application of a brake pedal.

Returning to operation 56, if the determination is negative, i.e. SOC is not below the threshold, then control proceeds to operation 62. At operation 62, a determination is made of whether a signal is received, indicative of a driver returning to a vehicle. This signal may be, for example, a signal indicating that a driver door has opened a second time, a signal indicating that a driver seat belt has been engaged, or other signal as appropriate.

If the determination of operation 62 is negative, i.e. no signal is received indicating the return of the driver, then control returns to operation 56. Thus, the engine remains auto-stopped until SOC drops below the threshold or the driver returns to the vehicle.

If the determination is positive, i.e. a signal is received indicating the return of the driver, then control proceeds to operation 60 and the convenience feature is returned to the previous state. The engine may or may not be auto-started according to the nominal stop-start control.

As may be seen, the present disclosure provides a vehicle and method which may, when a driver exits the vehicle, hold the vehicle stationary and extend the time available with the engine auto-stopped. This may increase fuel economy, and in turn, increase customer satisfaction. Particular advantages may be found when used in police vehicles or commercial vehicles.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

What is claimed is:

1. A method of controlling a vehicle, comprising:
responsive to an engine being auto-stopped and a signal indicating a driver exiting the vehicle, securing traction wheels against rotation, modifying a convenience feature power consumption from a first state to a decreased second state, and maintaining the engine in an auto-stopped condition; and
responsive to a signal indicating the driver returning to the vehicle, returning the convenience feature power consumption to the first state.

2. The method of claim 1, wherein the convenience feature power consumption is a climate blower cooling fan power consumption.

3. The method of claim 1, wherein the convenience feature power consumption is a heated seat system power consumption.

4. The method of claim 1, wherein the signal indicating the driver exiting the vehicle includes a signal from a seat belt sensor indicating that a driver seat belt has been disengaged.

5. The method of claim 1, wherein the signal indicating the driver exiting the vehicle includes a signal from a door sensor indicating that a driver door has been opened.

6. The method of claim 1, wherein the securing includes commanding a transmission to shift into PARK.

7. The method claim 1, wherein the securing includes commanding a parking brake to engage.

8. A vehicle comprising:
an engine; and
a controller configured to
responsive to the engine being auto-stopped and a signal indicating a driver exiting the vehicle, prevent wheel rotation, modifying a convenience feature power consumption from a first state to a decreased second state, and maintain the engine in an auto-stopped condition; and responsive to a signal indicating the driver returning to the vehicle, return power consumption of the convenience feature to the first state.

9. The vehicle of claim 8, wherein the convenience feature power consumption is a climate blower cooling fan power consumption.

10. The vehicle of claim 8, wherein the convenience feature power consumption is a heated seat system power consumption.

11. The vehicle of claim 8, wherein the signal indicating the driver exiting the vehicle includes a signal from a seat belt sensor indicating that a driver seat belt has been disengaged.

12. The vehicle of claim 8, wherein the signal indicating the driver exiting the vehicle includes a signal from a door sensor indicating that a driver door has been opened.

13. The vehicle of claim 8, wherein the controller configured to prevent wheel rotation includes commanding a transmission to shift into PARK.

14. The vehicle of claim 8, wherein the controller configured to prevent wheel rotation includes commanding a parking brake to engage.

* * * * *